(12) United States Patent
Hebenstreit et al.

(10) Patent No.: US 10,625,769 B2
(45) Date of Patent: Apr. 21, 2020

(54) MOTOR VEHICLE STEERING SYSTEM, ASSEMBLY TOOL AND ASSEMBLY METHOD FOR A MOTOR VEHICLE STEERING SYSTEM

(71) Applicant: Daimler AG, Stuttgart (DE)

(72) Inventors: Axel Hebenstreit, Stuttgart (DE); Hans-Dieter Loeffler, Reutlingen (DE); Thorsten Meyer, Wildberg (DE); Marco Schwieger, Hamburg (DE)

(73) Assignee: Daimler AG, Stuttgart (DE)

( * ) Notice: Subject to any disclaimer, the term of this patent is extended or adjusted under 35 U.S.C. 154(b) by 242 days.

(21) Appl. No.: 15/120,451

(22) PCT Filed: Feb. 7, 2015

(86) PCT No.: PCT/EP2015/000258
§ 371 (c)(1),
(2) Date: Aug. 19, 2016

(87) PCT Pub. No.: WO2015/124268
PCT Pub. Date: Aug. 27, 2015

(65) Prior Publication Data
US 2017/0066469 A1 Mar. 9, 2017

(30) Foreign Application Priority Data
Feb. 22, 2014 (DE) .......................... 10 2014 002 519

(51) Int. Cl.
*B62D 1/20* (2006.01)
*B62D 1/16* (2006.01)
*F16D 1/10* (2006.01)

(52) U.S. Cl.
CPC ................. *B62D 1/20* (2013.01); *B62D 1/16* (2013.01); *F16D 1/101* (2013.01);
(Continued)

(58) Field of Classification Search
CPC .. B62D 1/20; B62D 1/16; F16D 1/101; F16D 2300/12; F16D 2001/103; Y10T 74/20256; Y10T 403/7035; Y10T 403/7032
(Continued)

(56) References Cited

U.S. PATENT DOCUMENTS 2,239,192 A * 4/1941 Cutting ..................... F16D 3/06
2,525,695 A * 10/1950 Lombard ................ F16D 3/185
(Continued)

FOREIGN PATENT DOCUMENTS

DE         689 03 350 T2      3/1993
DE     10 2008 006 497 A1     7/2009
(Continued)

OTHER PUBLICATIONS

PCT/EP2015/000258, International Search Report dated May 12, 2015 (Two (2) pages).

*Primary Examiner* — Greg Binda
(74) *Attorney, Agent, or Firm* — Crowell & Moring LLP

(57) ABSTRACT

A motor vehicle steering system is disclosed. The system includes a steering spindle consisting of spindle members which are non-rotatably connected to one another. One end of a spindle member has a spline shaft profile and is introduced into a sleeve-like intermediate piece which is arranged on the other spindle member and, on the inner periphery, has a negative-shaped spline shaft profile with respect to the spline shaft profile such that the spindle member is plug-connected to the intermediate piece. In order for the spindle members to be able to be connected to each other with minimal effort even in the event of visual inaccessibility, a circumferential guide contour pointing toward the intermediate piece is formed on the spindle member. The guide contour is upstream of the spline shaft profile toward
(Continued)

the intermediate piece and is perforated by grooves of the spline shaft profile to form convex guide segments.

1 Claim, 4 Drawing Sheets

(52) U.S. Cl.
 CPC .... *F16D 2001/103* (2013.01); *F16D 2300/12* (2013.01); *Y10T 74/20256* (2015.01); *Y10T 403/7032* (2015.01); *Y10T 403/7035* (2015.01)

(58) Field of Classification Search
 USPC ...................................................... 403/359.4
 See application file for complete search history.

(56) References Cited

U.S. PATENT DOCUMENTS

| | | | | |
|---|---|---|---|---|
| 2,650,484 | A * | 9/1953 | Bujak | F16D 3/06 |
| | | | | 403/359.4 |
| 3,197,216 | A * | 7/1965 | Jackson | F16D 3/06 |
| | | | | 403/359.4 |
| 4,943,182 | A | 7/1990 | Hoblingre | |
| 9,126,622 | B2 * | 9/2015 | Hebenstreit | B62D 1/20 |
| 2012/0325041 | A1 * | 12/2012 | Sakuma | B62D 1/16 |
| | | | | 74/493 |

FOREIGN PATENT DOCUMENTS

| | | |
|---|---|---|
| DE | 10 2011 109 691 A1 | 2/2013 |
| DE | 10 2011 109 705 A1 | 2/2013 |

\* cited by examiner

MOTOR VEHICLE STEERING SYSTEM, ASSEMBLY TOOL AND ASSEMBLY METHOD FOR A MOTOR VEHICLE STEERING SYSTEM

BACKGROUND AND SUMMARY OF THE INVENTION

The invention relates to a motor vehicle steering system, an assembly tool and an assembly method for a motor vehicle steering system.

The hitherto existing direct screwing of the steering spindle members with one another in the engine compartment is only possible in the combined field of exhaust gas systems, catalytic converters, engines and transmission lines with considerable effort. Here, one spindle member is screwed together with the other spindle member, which is also referred to as a steering coupling if it is arranged at the end of the steering spindle rod, transversely with respect to the steering spindle direction. In the case of vehicles having front engines, this results in very poor accessibility of the components to be connected and the number of variants of arrangements for optimizing the accessibility for different engine variants and steering systems, such as left and right-hand drive models, increases significantly. In addition, standard assembly sequences, such as the time of assembly of the exhaust system, are hardly complied with or are not complied with at all.

DE 10 2008 006 497 A1 describes an assembly arrangement for connecting an upper steering spindle member to the steering coupling. The end of the steering spindle member is introduced into an end-side receiving region of the steering coupling, wherein the assembly arrangement comprises a device to ensure that the steering spindle member and the steering coupling can be aligned coaxially. To that end, the steering spindle member has an end-side hook element, into which a strap loop protruding from the end-side receiving region of the steering coupling is mounted before the final assembly of the engine with the vehicle body. Due to the tight installation space conditions, the steering spindle rod normally impedes the assembly of the engine module with the vehicle body, whereby assembly becomes time consuming and likely to involve injury.

A steering arrangement is known from DE 10 2011 109 691 A1 in which an upper steering spindle member is plugged together with the steering coupling via an intermediate piece arranged on the steering coupling by means of a tongue-and-groove connection aligned axially, wherein a compression spring, which is operatively connected to the intermediate piece, braces the intermediate piece and therefore the steering coupling with the end of the upper steering spindle member. The steering spindle member end is thereby moved axially into the intermediate piece, which is then shifted towards the steering spindle member end against the compression spring force and is hooked onto an undercut of the steering spindle member end formed of an annular groove. The assembly of the steering spindle members, so the steering coupling and upper steering spindle member, with each other does not require any screwdrivers and can be executed without excessive force. The correct relative position of the two steering spindle members is recognized by the installer by means of one or more visual markers, such that incorrect positioning is excluded during assembly. However, in the case of particularly tight installation spaces, the visual marking is difficult to see, which is why assembly is more difficult in these cases.

Based on this prior art, the object arises to create a motor vehicle steering system in which two steering spindle members, in particular an engine compartment side spindle member and the subsequent steering coupling, are able to be connected to each other with minimal effort even in the event of visual inaccessibility.

This object is solved by a motor vehicle steering system.

Furthermore, the object arises to create an assembly tool for a motor vehicle steering system which makes it possible to assemble a motor vehicle steering system according to the invention in a convenient manner, with minimal effort and with a low risk of injury.

This object is solved by an assembly tool for a motor vehicle steering system.

Finally, the object also arises to provide an improved assembly method for motor vehicle steering systems with respect to the quality and speed of the design.

This object is solved by an assembly method for a motor vehicle steering system.

A first embodiment relates to a motor vehicle steering system which has a steering column having a steering spindle, which contains several steering spindle members connected to one another in a non-rotational manner. The steering spindle end of the one steering spindle member has a spline shaft profile positioned in the axial direction on the outer periphery and is thereby introduced into a sleeve-like intermediate piece which is arranged on the other steering spindle member adjacent to the steering spindle in the longitudinal direction, in particular the steering coupling. On the inner periphery, the intermediate piece has a negative-shaped spline shaft profile with respect to the spline shaft profile of the spindle member. The one spindle member is plug-connected to the intermediate piece and therefore to the other spindle member by engagement of the two spline shaft profiles. In other words, the other steering spindle member supports the intermediate piece. A circumferential guide contour pointing towards the intermediate piece is formed on the spindle member, the guide contour being upstream of the spline shaft profile towards the intermediate piece and being perforated by the grooves of the spline shaft profile to form convex guide segments.

The guide contour can be an integral component of the spindle member opposite the intermediate piece, or it can be a separate member joined to this spindle member, According to the invention, the guide contour is arranged in an edge region of the front surface of the end of the spindle member, wherein the guide contour can be an annulus in a top view of this front surface. During processing of the shell surface of the spindle member end or the guide contour, the guide contour is delimited on the end side by a gently multi-curved or undulated design curve path which has at least one low point (i.e. a bulge) and one high point (i.e. an indentation). The bulges or indentations themselves can be symmetrical such that, in the inserted position, the longitudinal axes of the teeth of the spline shaft profile of the intermediate piece run through the "virtual" vertices (indentations) and the longitudinal axes of the grooves run through the actually present vertices (bulges) of the guide contour of the spindle member. In the case of indentations, the vertices are not actually present (i.e. are only to be understood in the sense of a constructive auxiliary point), since they are located in the region of the groove(s) of the spline shaft profile of the spindle member.

The guide contour should therefore help, when bringing the spindle member into contact with the intermediate piece, to make it easier to find the exact and single correct angular position in which the two spline shaft profiles are able to be brought into engagement. The curvatures of the guide contour are thereby formed in such a way that they are not able to interlock with opposite teeth of the spline shaft profile of the intermediate piece but rather slide gently on the upper sides of the teeth of the spline shall profile of the intermediate piece in the event of relative rotation of the two members. The support on the guide contour is transferred from tooth to tooth until the correct angular position is achieved for engagement. This sliding process of the guide contour on the upper sides (or partially on the flanks) of the teeth is to be compared to the sliding of a probe pin on a cam disc, wherein the guide contour performs an oscillating axial movement by means of the characteristic curvatures during rotation of the spindle member about its longitudinal axis or during rotation of the intermediate piece about its longitudinal axis. The guide contour is designed according to the invention in such a way that the axial distance of the one spindle member from the intermediate piece of the other spindle member (steering coupling) is minimal in the engaging position, which an installer, on the other hand, is also able to detect in a tactile manner. The spindle member can be shifted in the axial direction in order to have more freedom of movement during assembly, and can additionally be locked, even in the final assembled position, for example braced.

The embodiment of the end of the steering spindle member according to the invention makes it significantly easier for the installer to introduce this into the intermediate piece of the steering coupling, since the steering coupling is usually arranged in a jagged region in the engine compartment, which is hard to reach by hand (also visually very poorly accessible), of a motor vehicle and it was previously very difficult to determine the correct relative position of the one steering spindle member for steering spindle coupling purely by feeling. With the present invention, an installer can bring together the end of the steering spindle member and the intermediate piece without notchy jamming and therefore detect in a tactile manner whether it is located in the predetermined assembly position.

In a further embodiment, the spline shaft profile can be asymmetrical, wherein the tooth spacings, the tooth widths and/or the tooth depths of the spline shaft profile can be different. The guide contour or the guide segments can furthermore have an undercut opened with respect to the intermediate piece.

By means of such an asymmetrically formed spline Shaft profile, the one spindle member is only able to be introduced into the intermediate piece of the steering coupling at precisely one predetermined angular position, thereby enabling the angular position of the steering coupling to correspond exactly to a predetermined steering wheel position. According to a poka-yoke principle, assembly is simplified through this and sources of error are eliminated. As a result, reworking, which comprises a straight-line positioning of the steering wheel, can be dispensed with. Furthermore, individual tooth/grooves pairs of the spline shaft profile are formed to be tapered on the end side in order to achieve an effective centering of the spindle member assigned to the steering column during insertion into the intermediate piece.

In a further embodiment, the spindle member assigned to the steering column can be hollow at least on its steering spindle end, wherein the intermediate piece has s at least one tongue-shaped protrusion protruding radially inwards on a front side facing the spindle member end, the protrusion engaging with the spline shaft profile of the spindle member assigned to the steering column and preferably being positioned, in particular curved, upwards by a predetermined amount.

"Upwards" here means the direction which points towards the end of the spindle member assigned to the steering column. The respective tongue-shaped protrusion should further facilitate assembly by this being brought into contact or engagement with the guide contour before the spline shaft profile of the steering spindle member end engages with the spline shaft profile of the intermediate piece. This means that the process of aligning the angular positions of the spindle member and steering coupling can already start when both members still have a predetermined axial distance from one another.

The poka-yoke principle can also be fulfilled in the case of a symmetrical spline shaft profile by an additional axially running groove being formed both on the outer side of an individual specific tooth of the spline shaft profile of the spindle member assigned to the steering column as well as in alignment in the adjoining guide segment. This additional groove has its functional equivalent in an additional tooth, which is formed to be negative-shaped, of the spline shaft profile of the intermediate piece. Furthermore, to guarantee the principle, a tongue-shaped special protrusion must be formed on the intermediate piece, the width of which is smaller than the groove width of the additional groove. As such, only individual relative positioning of the spindle members with respect to one another can lead to engagement of the spline shaft profiles with one another, whereby an absolutely clear, correct mounting position is achieved.

The production of the tongue-shaped protrusion is particularly easy to implement when the intermediate piece comprises, for example, a deep-drawn and stamped metal sheet part, wherein the tongue-shaped protrusion can be easily curved out facing upwards. Of course, it is also possible that the spindle member assigned to the steering column is an entirely hollow shaft, for example a telescopic hollow shaft. It is also expedient if one tongue-shaped protrusion is present per tooth of the spline shaft profile of the intermediate piece, wherein these protrusions preferably follow the design of the spline shaft profile in spacing, depth and width. In combination with an at least partial undercut of the guide segments on the front surface facing the intermediate piece, ideal guiding and centering of the guide segments and therefore the spindle member assigned to the steering column results upon insertion with the tongues which are bent out. Due to the undercut, line contact only exists between its one end and the tongues of the intermediate piece.

Alternatively or additionally, an insertion extension can extend coaxially at least from the guide contour of the spindle member in a direction facing the intermediate piece, the insertion extension being introduced into the intermediate piece during plugging together of the two spindle members.

The insertion extension is therefore arranged on the end of the spindle member, seen in the direction of the intermediate piece, substantially in front of the guide contour. This serves to ensure that, during assembly, even before the tongue-shaped protrusions are in contact or in engagement with the guide contour, the spindle member assigned to the steering column is aligned roughly radially on the intermediate piece such that an installer is able to carry out assembly quickly and safely even in the hardly visible, relatively poorly accessible environment. The insertion extension can furthermore have a chamfer on its free end, which further enables insertion. The diameter of the insertion extension can be selected, depending on the performance level to be achieved, at a predetermined amount which is smaller than the internal diameter of the toothing of the intermediate piece spline shaft profile.

According to an alternative embodiment, at least the guide contour and/or the insertion extension can be a part of a plastic plug which is connected releasably to the spindle member.

In this embodiment, the guide contour and/or the insertion extension are not an integral part of the spindle member, but rather a part of a separate member which is connected to the spindle member. Here, plastic is particularly advantageous since it has a low friction coefficient on metals and also does not leave behind surface damage in the form of scratches in the event of unlubricated sliding. In addition, it is also conceivable that the guide contour and/or the insertion extension are injected or vulcanized as a type of collar sleeve onto the spindle member end.

Furthermore, the plastic plug can have a connection extension extending in the axial direction towards the spindle member, the connection extension being plugged into the end of the hollow spindle member, wherein the connection extension preferably supports a circumferential seal, particularly preferably a profile seal, an O-ring or a sealing lip.

The connection extension is thereby plugged into the hollow end of the steering spindle member and primarily serves for the secure fastening of the plastic plug, provided that this is not injected. Furthermore, such a connection extension can help to improve the sealing of the spindle member, from which an improved corrosion resistance results for the spindle member. Surprisingly, however, by using the connection extension, a clear reduction in the sound level in the interior of the motor vehicle can be achieved, since the connection extension acoustically seals the usually hollow spindle member to the greatest extent possible.

The connection extension can furthermore be hollow and the interior of the connection extension can preferably have an expanding means, particularly preferably an expanding rivet.

The expanding means serves for the fastening of the connection extension in the hollow end of the spindle member. The plastic plug having the connection extension is thereby introduced into the hollow end for assembly and the expanding means is then triggered. Alternatively, the connection extension can also be pressed in a classic manner, for which, however, a suitable pressing device is potentially required A further alternative embodiment refers to the fact that the insertion extension is hollow and at least one engaging means is present on an inner shell surface, preferably a circumferential engaging rib, which is formed to be brought into engagement with an assembly tool.

Here, hollow should also mean that the end of the insertion extension facing the intermediate piece is open. The engaging ribs should thereby optimize the power transmission from the assembly tool to the plastic plug and prevent slipping of the assembly tool. During assembly, the assembly tool can be jammed, hooked or braced in the insertion extension, depending on what appears to be useful. In order to further increase assembly safety, three or more engaging ribs can also be present in the insertion extension.

An assembly tool according to the invention for a motor vehicle steering system has an engaging section, which is able to be brought into engagement with corresponding engaging means of the insertion extension, and a handle connected thereto by means of a connection means.

The connection means can therefore be a flexible section of a string, a wire, a cable or any other elastic core. However, the connection means can also have a predetermined minimum stiffness and shape, such that, during assembly of a motor vehicle steering system from a motor vehicle bottom side, other units present in the engine compartment are able to be guided around. The engaging means can be any engaging means known to the person skilled in the art, such as lugs, adhesive surfaces or a clamping bellows, which is also able to be pressurized.

The assembly method for a motor vehicle steering system according to the invention using an assembly tool according to the invention comprises the following steps:

Preparing and defined positioning of two steering spindle members with respect to each other, preferably a spindle member assigned to the steering column and the steering coupling, Connecting the engaging section of the assembly tool to the engaging means of the insertion extension of the spindle member assigned to the steering column, Moving the assembly tool in a direction facing towards the other spindle member (steering coupling), Separating the assembly tool from the engaging means of the insertion extension of the spindle member assigned to the steering column at a predetermined distance from the steering coupling, Relative rotation of the steering spindle member assigned to the steering column and of the intermediate piece, until the spline shaft profiles are ready for engagement, Inserting the steering spindle member end into the intermediate piece to a predetermined end position.

Since the spindle member assigned to the steering column is usually assembled in the collapsed condition in a motor vehicle shell as a part of an extendible steering column, the use of the assembly tool according to the invention is associated with a greatly reduced workload. The tool is coupled to the steering spindle member end for power transmission and then guided in the direction of the steering coupling, wherein the steering spindle member is shifted, for example, in the sliding seat. If the steering spindle member end is reached at the predetermined (relatively small) distance from the steering coupling, then the assembly tool can be disconnected and the installer can connect the spindle member to the intermediate piece without having to strain, so is ergonomically advantageous, as is described above.

These and other advantages are demonstrated by the description below with reference to the accompanying figures. The reference to the figures in the description serves for the simplified understanding of the subject matter. Subject matters or parts of subject matters that are essentially the same or similar can have the same reference numerals added to them. The figures are only a schematic depiction of one embodiment of the invention.

DETAILED DESCRIPTION OF THE DRAWINGS

Figure 1:
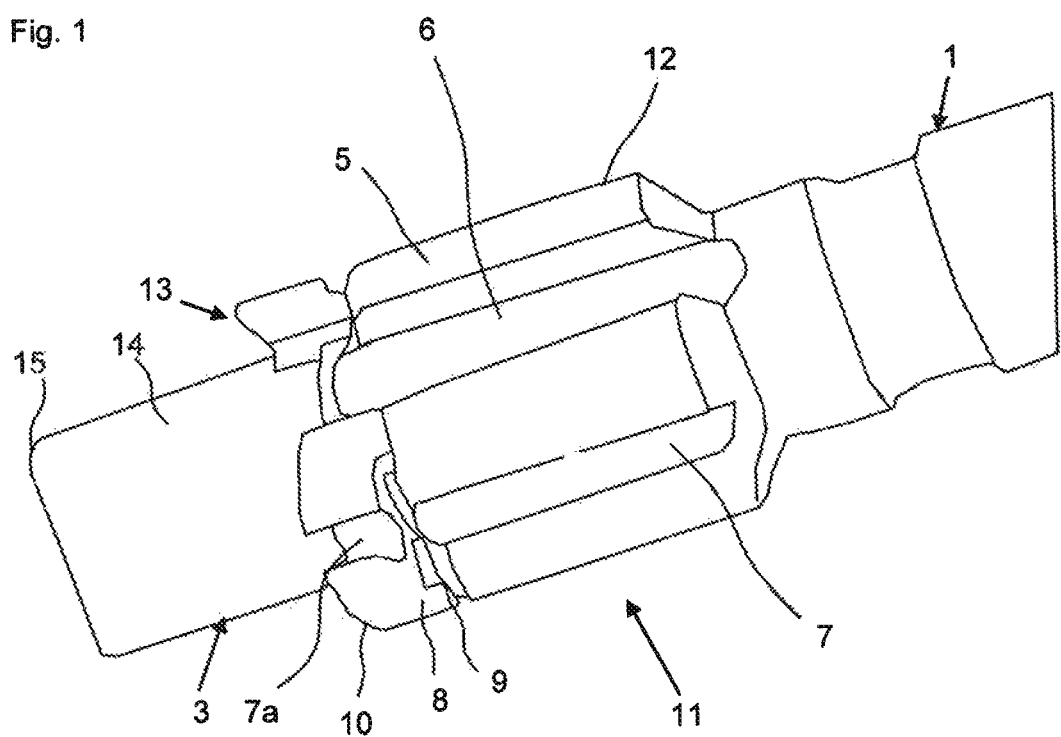
FIG. 1 a perspective view of a spindle member assigned to a steering column having an attached plastic plug, FIG. 2 a perspective view of the connection of the spindle member from FIG. 1 assigned to the steering column having a steering coupling, FIG. 3 a longitudinal section of the plastic plug from FIG. 1, and FIG. 4 a perspective view of the spindle member from FIG. 1 assigned to the steering column having an assembly tool coupled thereto.

The stump depicted in FIG. 1 of a spindle member 1 assigned to a steering column shows the end 11 which is connected in an assembled motor vehicle steering system to the steering coupling 2 (FIG. 2) by means of a sleeve-like intermediate piece 21 supported by this. The spindle member 1 has a spline shaft profile 12 on its end 11, with the same tooth spacing and tooth depths and tooth widths, which leads to the spindle member 1 being relatively easy to produce. The spline shaft profile 12 consists of teeth 5 and grooves 6, which each have a conical shape in the vertical direction (this means the thickness direction) and taper towards the end 11 of the spindle member 1. The intermediate piece 21 also has a spline shaft profile on the inner side which is formed to be negative-shaped with respect to the spline shaft profile 12 of the spindle member 1. The spline shaft profile of the intermediate piece is also designed in the vertical direction conically with the same taper angle, wherein, however, the cone opens towards the spindle member 1. As a result, a wedge clamping force is used during assembly of the two spindle members 1 and 2 which achieves particularly good hold of the two members 1 and 2 with respect to each other. This becomes even more important since a compression spring based clamping device is integrated in the intermediate piece 21 which takes effect in the end position of the plug connection and pulls the two members towards each other, whereby the wedge clamping force is very large. In addition, the teeth 5 and the grooves 6 can be formed conically in the width direction, wherein the grooves 6 open towards the end 11 of the steering spindle and the teeth 5 are tapered. The spline shaft profile of the intermediate piece 21 is correspondingly formed to be negative-shaped, such that, when plugging together the two members 1 and 2, a wedge clamping force which acts transversely to the plug-in direction is achieved in this respect too.

Figure 3:
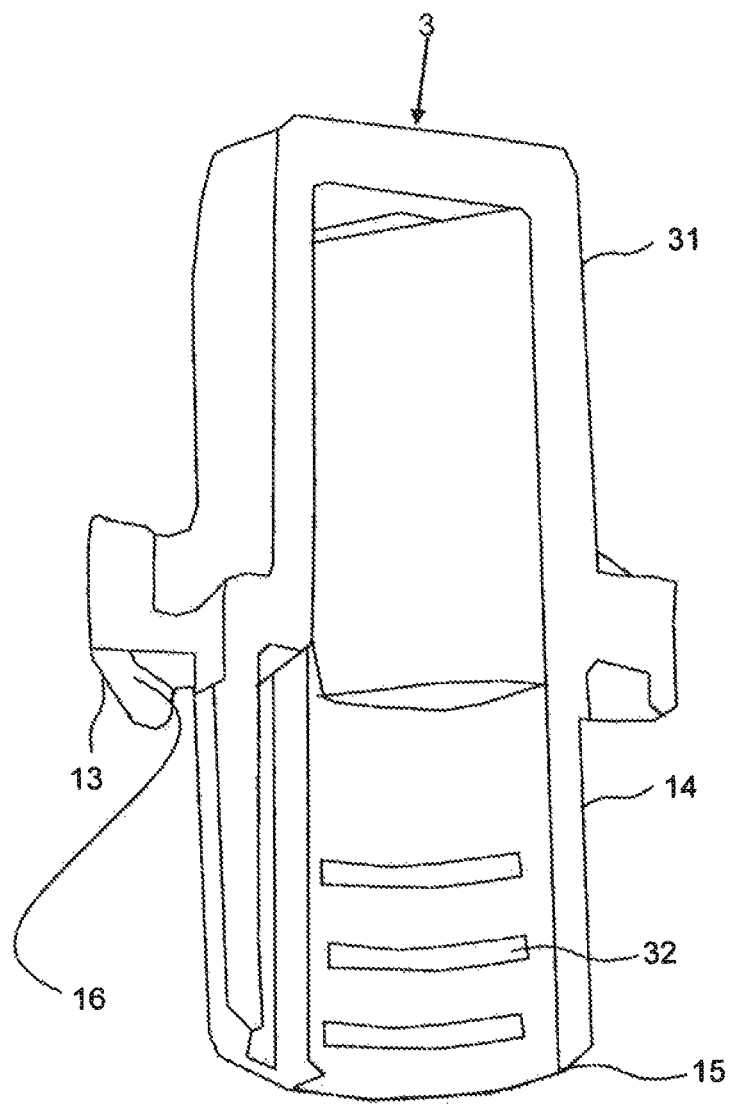

A plastic plug 3 can be seen at the end side upstream of the spline shaft profile 12 of the spindle member 1 in the direction of the intermediate piece 21, the plastic plug having a guide contour 13 next to an insertion extension 14 (also see FIG. 3). The insertion extension 14 is provided with a small but effective chamfer 15 on its end side front surface, which should help during assembly to improve centering of the plastic plug 3 and therefore of the spindle member 1 in an assigned receiver, here the intermediate piece 21 of the steering coupling 2. The grooves 6 of the spline shaft profile 12 extend axially through the guide contour 13, which is formed on the bottom side of an annular collar 8 facing away from the steering spindle member 1, or they break through axially to form guide segments 10. The annular collar 8 thereby forms the contact surface between the plastic plug 3 and the spindle member 1 with its upper side 9 and closes largely flush with the spline shaft profile 12. If you were to look at the processing of the guide contour 13, then you would see an undulating curve path which delimits the guide contour 13 on the side facing away from the contact surface. In the case of the delimited curve path, the bulged or indented sections themselves can be symmetrical, wherein the longitudinal axes of the grooves 6 of the spline shaft profile 12 run through the vertices of the indented sections and either the longitudinal axis of a groove 6 or of a tooth 5 of the spline shaft profile 12 runs through the vertices of the bulged or indented sections. The guide contour 13 is formed to facilitate assembly of the steering spindle member 1, which usually takes place in a tight, i.e. visually and tactilely barely accessible region. According to the operating principle of the cam disc and probe pin, it makes it possible for the installer to detect the correct angular position in a tactile manner.

In an embodiment which is not depicted figuratively, the insertion extension 14 and the guide contour 13 can principally also be integral components of the steering spindle member 1, which, however, would be associated with higher costs for processing of the steering spindle member 1, which is mostly produced from metal. A plastic part according to the invention is particularly advantageous at this point, since it can be produced with complex shapes in a cost-effective manner, for example by injection molding.

For the assembly of the steering spindle member 1, which is mostly telescopic as part of a telescopic steering column, with the steering coupling 2, the steering spindle end 11 of the spindle member 1 is introduced very closely on the region of the steering coupling 2, which is intended for receiving the steering spindle member 1, in particular on the intermediate piece 21. Such a position shortly before the insertion of the steering spindle member 1 into the intermediate piece 21 is depicted in FIG. 2.

Figure 2:
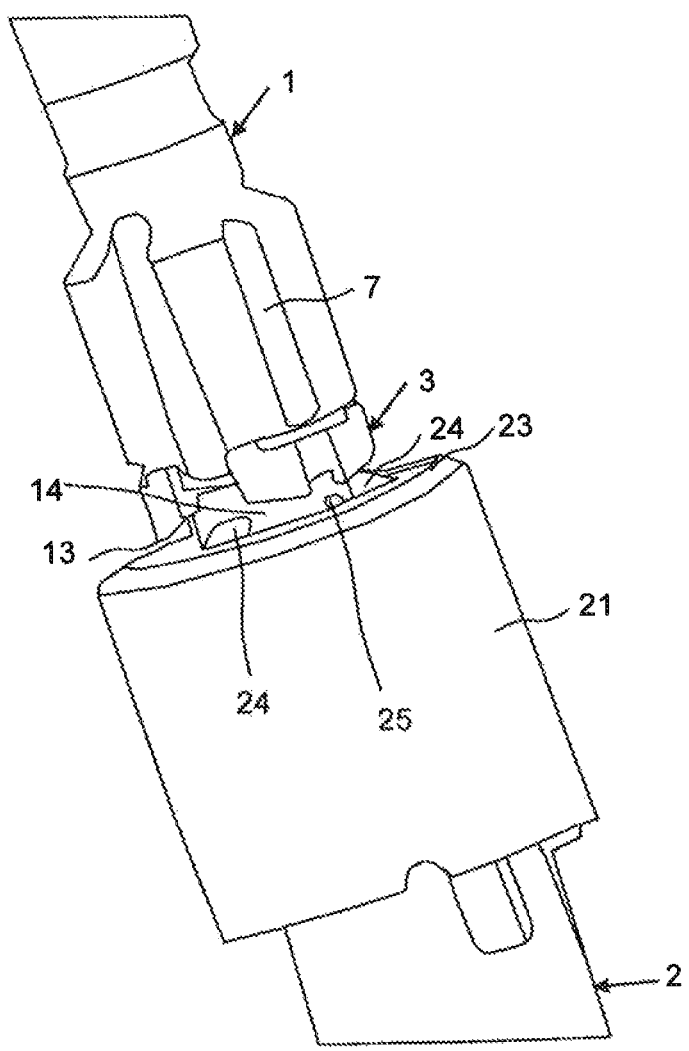

In FIG. 2 it is clear to see how the insertion extension 14 of the spindle member 1 assigned to the steering column or of the plastic plug 3 partially protrudes into the steering coupling 2. Furthermore, the intermediate piece 21 is depicted as a part of the steering coupling 2 which is held moveably on the steering coupling 2. The teeth of the spline shall profile are formed in the interior of the substantially cylindrical intermediate piece 2 the teeth being brought into engagement in a joined position with grooves 6 of the spline shaft profile 12 of the spindle member 1. Protrusions 24 protruding radially inwards, which are formed as tongues 24, are arranged on a front side 23 of the intermediate piece 21 facing the spindle member 1. Furthermore, the tongues 24 are also bent upwards to a certain extent, i.e. in the direction of the spindle member 1, which is also easy to implement in terms of production since the intermediate piece 21 can be produced at least partially, for example, by means of deep drawing and stamping a sheet metal. If the spindle member 1 is now to be coupled operatively to the steering coupling 2 as intended, then the spindle member 1 is introduced even more closely on the intermediate piece 21 of the steering coupling 2, until the collar 8 having the guide contour 13 rests on the tongues 24. If the relative angular position of the two coupling partners is already suitable, then the spline shaft profiles matched geometrically with respect to each other are able to simply slide into each other.

In the event of the individual teeth/grooves 5,6 of the spline shaft profile 12 and therefore also of the spline shaft profile of the intermediate piece 21 differing in terms of width, spacing and depth, it is possible to couple the spindle member 1 in accordance with the poka-yoke principle only in exactly one angular position to a steering coupling by means of this asymmetrical spline shaft profile 12. This is advantageous during installation of the spindle member 1 or the steering coupling 2 in a motor vehicle shell, since installation is only possible in one single angular position of the steering coupling 2 and spindle member 1, to which the steering wheel is coupled, which leads to a straight-line positioning of the steering wheel.

The guide contour 13 helps the installer to find this angular position exactly. For this purpose, the installer rotates the steering spindle member 1 slowly in any peripheral direction, wherein the undulated, gently curved regions of the guide contour 13, so the guide segments 10, slide on the tongues 24. Since the widths of the grooves 6 of the spline shaft profile 12 and the widths of the tongues 24 are also different, the tongues 24 cannot accidentally lock into an incorrect groove. Like a cam disc, the guide contour 13 slides on the tongues 24. The installer then continues to rotate it until the predetermined assembly position is reached. In this case, the tongue 24 is located in the region of the assigned indentation (as depicted) and is guided from the flanks of the guide contour 13 in such a way that the tongue 24 continues to rotate virtually automatically in the event of further slight axial pressure being applied in the direction of the vertex of the indentation and then the spline shaft profile 12 can finally be brought into engagement. As a rule, the spindle member 1 is a hollow shaft member or it is at least hollow on the end 11 facing the intermediate piece 21 in order to be able to receive the plastic plug 3 according to the invention, for example by gluing, pressing, expanding.

The poka-yoke principle is similarly fulfilled in a preferred alternative embodiment when the spline shaft profile 12 is symmetrical. However, this requires special precautions. A straight groove 7 running consistently axially is also introduced for this purpose in the outer side in one of the teeth 5 of the steering spindle member 1, the groove containing a section 7a in the annular collar 8. This groove 7 interacts with an additional tongue 25 arranged on the front side 23 of the intermediate piece 21. The groove 7 and the tongue 25 thereby have a width which is different from the grooves 6 and the tongues 24 and/or are arranged asymmetrically with respect to the grooves 6 and 24 in the peripheral direction of the spindle members 1 and 2. Here, the spline shaft profile 12 of the spindle member can only engage with the intermediate piece 21 and thus with the steering coupling 2 when the groove 7 and the tongue 25 lie opposite each other, wherein the tongue 25 slides into the groove 7 during plugging together of the spindle members 1 and 2. In order to find this single possible inserted position, the installer proceeds in the same way as in the aforementioned alternative exemplary embodiment.

In FIG. 3, the plastic plug 3 is finally seen in a longitudinal section. This has a connection extension 31 which can be introduced into the steering spindle member end (which is hollow) as intended. For better fixing of the connection extension 31 in the spindle member 1, the outer diameter thereof can be designed to be slightly larger than the inner diameter of the corresponding bore of the steering spindle member 1. Or alternatively, which is not depicted in the figure, a suitable expanding means, for example an expanding rivet, can be present in the interior. The plastic plug 3 can further contribute to improving the acoustic decoupling of the engine compartment, since otherwise, all types of sounds can enter the passenger compartment through the hollow steering spindle member 1. On the other end, the plastic plug 3 has an insertion extension 14 which plunges, for example, into an intermediate piece 21 (see FIG. 2) during assembly of the spindle member 1 having the steering coupling 2. Here, the insertion extension 14 is hollow and has a chamfer 15 on its end which should facilitate insertion for the installer and improve centering at the same time. Three engaging ribs 32 are arranged on the inner shell surface, with which an assembly tool 4 (FIG. 4) can be brought into engagement for the convenient and low-effort shifting of the plastic plug 3 or the spindle member 1 coupled to the plastic plug 3. Depending on the force to be applied, there can of course also be more or fewer engaging ribs 32 present or, which is not shown in the figure, completely different engaging means which seem suitable to the person skilled in the art. Furthermore, it is also possible, but not shown figuratively, that a sealing is present on an (outer) shell surface of the connection extension 31 which is to prevent moisture and dirt from being able to enter the spindle member 1 and causing corrosion there.

The guide contour 13 is an integral component of the plastic plug 3 and forms a type of "double collar sleeve" together with the connection extension 31 and the insertion extension 14. Furthermore, the guide contour 13 has an undercut 16 on its front side facing the insertion extension 14 which should improve the guide of the guide contour 13 on the tongues 24 shown in FIG. 2. The ends of the tongues 24 shown there lie in a region of the undercut 16 on the guide contour 13, whereby there is virtually only line contact between the two parts. In addition, radial guiding and centering of the spindle member 1 on the spindle member 2 is also thereby improved. In this context, handling rotational movement is also supported since slipping is avoided as a result of radial stability.

Figure 4:
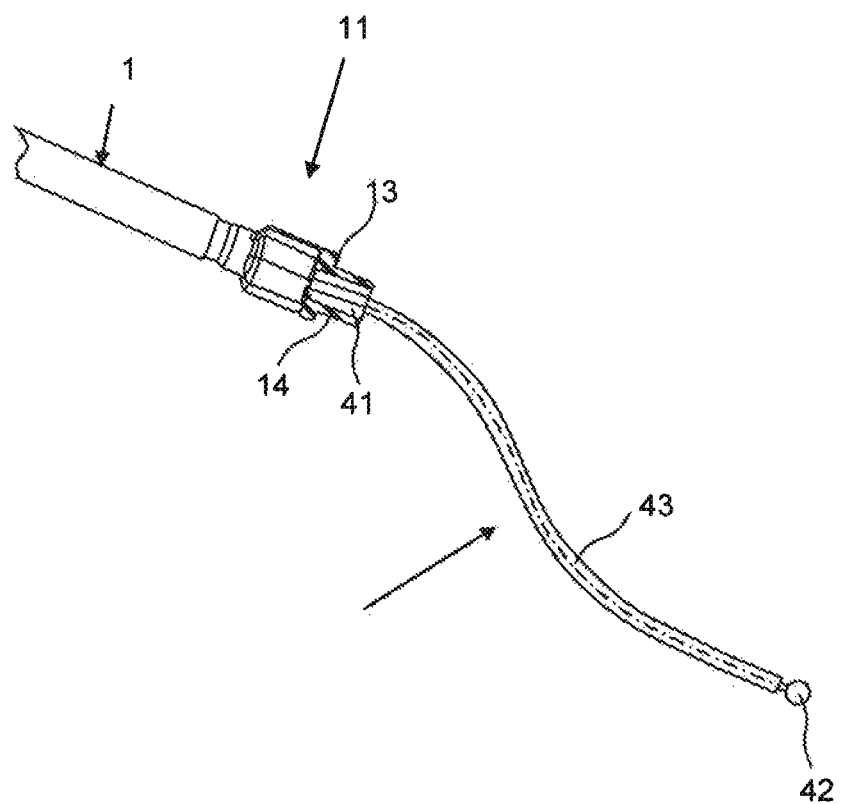

The above-mentioned coupling of the assembly tool 4 to the insertion extension is depicted in FIG. 4. The assembly tool 4 according to the invention has a handle 42 for this purpose which is connected to an engaging end 41 by means of a shaft 43. The shaft 43 can consist of a fibre-reinforced plastic. It can be rigid or it can be a flexible wire or a cable or an elastic core. It is also possible that the shaft 43 has a shape which is adapted to the installation situation in the motor vehicle, the shape being suitable, for example, to enable the use of the assembly tool 4 during assembly from below without obstructions due to other units in the engine compartment. The assembly tool 4 has corresponding engaging means on the engagement end 41 which are to be supported in the engaging means 32 of the insertion extension 14 (see FIG. 3). The engaging means of the assembly tool 4 can, however, also be a simple inflatable balloon or an elastic bellows. By means of the assembly tool 4 shown, the installer can pull out a telescopic steering spindle, assembled in the motor vehicle shell in the collapsed condition, in a convenient manner to its length corresponding to the assembly condition without having to expose himself/herself to the risk of finger injuries.

The invention claimed is:
1. A motor vehicle steering system, comprising:
a steering spindle including a first spindle member and a second spindle member, wherein the first spindle member is non-rotatably connected to the second spindle member, wherein an end of the first spindle member has a spline shaft profile disposed in an axial direction on an outer periphery of the first spindle member, wherein the spline shaft profile is disposed in a sleeve intermediate piece which is disposed on the second spindle member; and
a plug having a circumferential guide contour;
wherein the spline shaft profile has a plurality of teeth and a plurality of grooves;
wherein the plurality of grooves of the spline shaft profile extend axially through the circumferential guide contour;
wherein an insertion extension extends coaxially at least from the circumferential guide contour in a direction facing the sleeve intermediate piece and wherein the insertion extension is disposed in the sleeve intermediate piece;

wherein the insertion extension is hollow, wherein an engager is disposed on an inner shell surface of the insertion extension, and wherein the engager is a circumferential engaging rib.

* * * * *